Feb. 21, 1939. G. L. MARTIN 2,147,795
AIRCRAFT CONSTRUCTION
Filed July 28, 1937   3 Sheets-Sheet 2
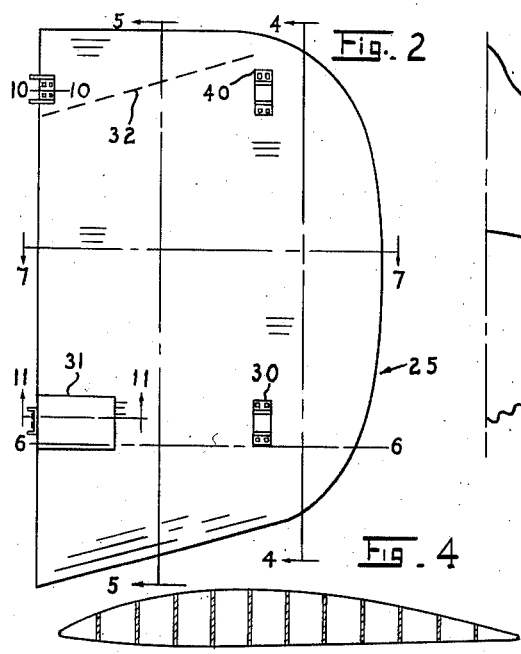
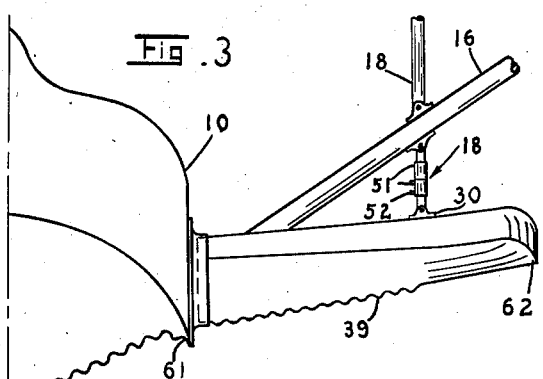
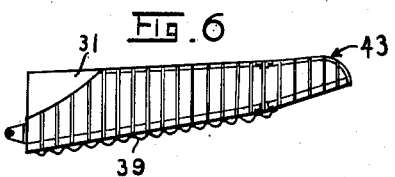
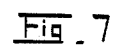
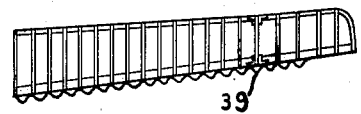
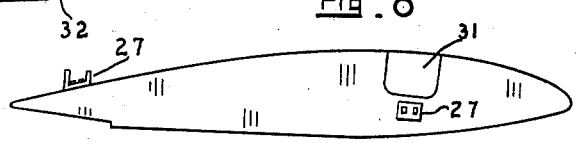
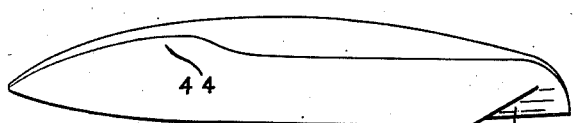
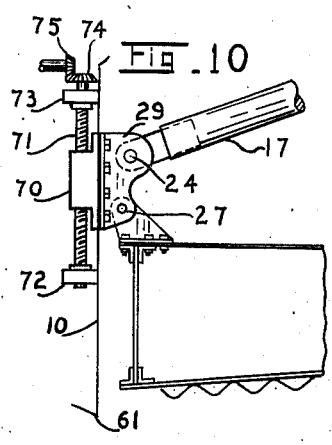
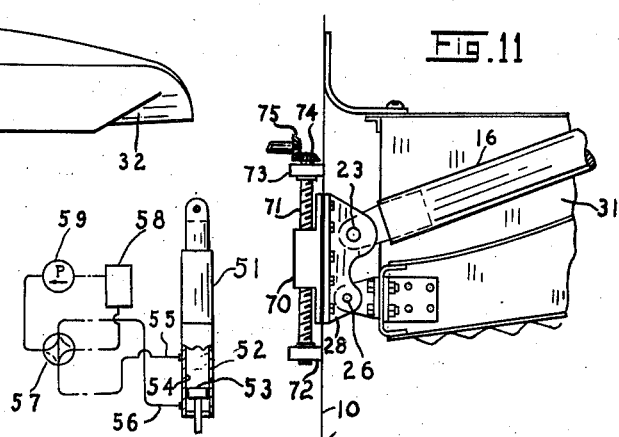
INVENTOR.
GLENN L. MARTIN
BY
ATTORNEY.

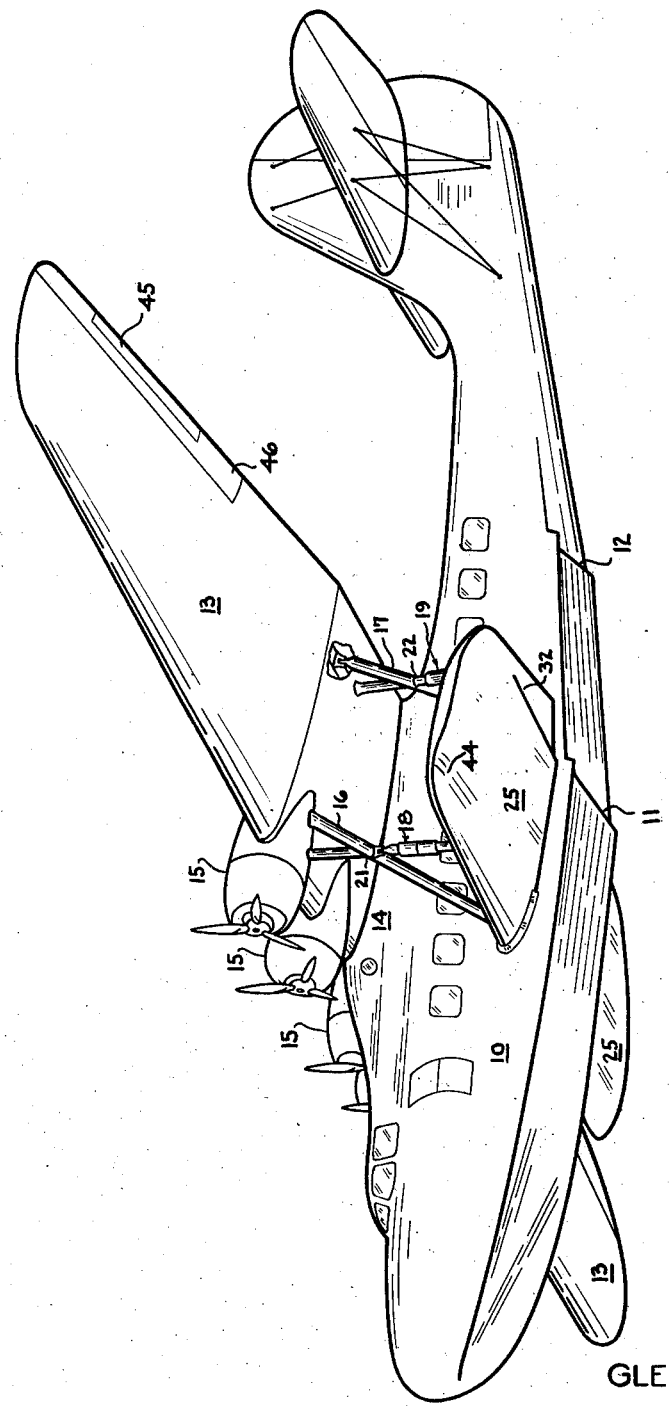

Feb. 21, 1939.   G. L. MARTIN   2,147,795
AIRCRAFT CONSTRUCTION
Filed July 28, 1937   3 Sheets-Sheet 3
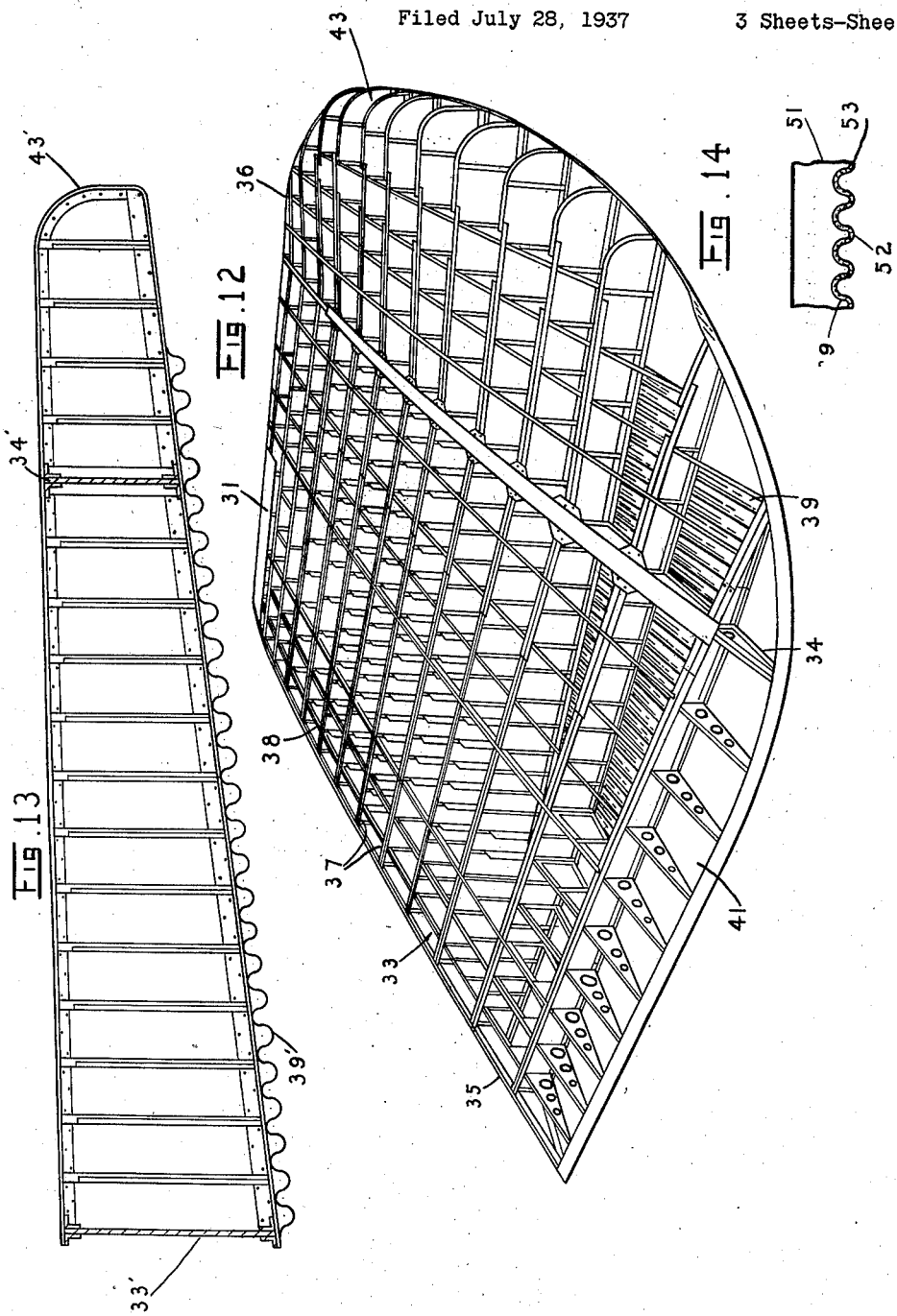
INVENTOR.
GLENN L. MARTIN
BY
ATTORNEY.

Patented Feb. 21, 1939

2,147,795

UNITED STATES PATENT OFFICE 2,147,795

AIRCRAFT CONSTRUCTION

Glenn L. Martin, Baltimore, Md., assignor to The Glenn L. Martin Company, Baltimore, Md.

Application July 28, 1937, Serial No. 156,053

15 Claims. (Cl. 244—106)

This invention relates to flying boats and more particularly, but not necessarily, to flying boats of the transoceanic type.

In flying boats of the present type, which are adapted to land on and take off from the surface of water, lateral stabilizing means is required. Various types and kinds of lateral stabilizing means such as auxiliary, or wing tip floats, and sponsons, or stabilizing fins, have heretofore been proposed, some of which have been operable but not satisfactory for use under all conditions.

The types of lateral stabilizers heretofore known to me offer undue resistance to their passage through the air, do not give the righting effect required to meet the upsetting forces and other disturbing elements under all operating conditions, and so effect the maneuvering of the flying boat while taxiing, taking off, or landing.

Some of the objections to auxiliary, or wing tip floats, are that these floats rise clear of the water too early in the take-off run and if their position is made lower in the construction of the flying boat, they drag heavily and tend to dig in the water; such floats tend to catch the waves and cause looping of the boat and are often carried away by the force of the impact; these floats are attached to the wing structure and subject the wing structure to great strains; also flying boats or seaplanes equipped with wing tip, or auxiliary floats, are very difficult to maneuver against cross-winds in view of the fact that as soon as the boat or plane is turned broadside into the wind the boat or plane is tilted by the action or pressure of the wind on the undersurface of the wing first contacted by the wind, causing the float carried by the other wing to contact the water, the resistance of which in many instances is sufficient to prevent further turning movement of the aircraft and has been known to cause serious accidents and great damage. Such sponsons, or laterally extending stabilizing fins, as have heretofore been provided, are unstable on and under water as well as add materially to air drag.

It is one object of the invention to provide lateral stabilizing fins, or sponsons, for flying boats that shall overcome the above difficulties.

Another object is to provide improved stabilizing fins, or sponsons, for use on flying boats that shall not only operate to stabilize the flying boat on water, but will assist in the maneuvering of the boat on the water.

Another object is to provide lateral stabilizing fins, or sponsons, for flying boats having the above characteristics that shall be particularly adaptable for maneuvering the boat against cross-winds, as well as to provide the required righting effect to meet the other upsetting and disturbing elements to which a flying boat is subjected while maneuvering on the water.

Another object is to provide lateral stabilizing fins, or sponsons, for flying boats having the above characteristics that shall be particularly adaptable for accommodating useful loads such as fuel, water, cargo, and the like.

Another object is to provide a flying boat having the above characteristics, wherein the stabilizers, or sponsons, are adapted for supporting and properly distributing the various loads to which they are subjected in such a manner as to provide a better overall flying boat construction.

Another object is to provide a flying boat having efficiently effective means for hydroplaning upon water in preparation for taking off under full load for transoceanic flights.

Another object is to provide an improved sponson for flying boats having a novel step arrangement that shall provide transfer of the stabilizing forces of the sponson to the hull bottom and air surfaces with increasing speed, and that shall provide for uniform transfer of the stabilizing forces from the sponson and hull, to the hull alone, with increasing speed.

Another object is to provide a sponson of novel construction, wherein the angle of the aft-bottom surface of the sponson is set at a specific angle to the forward undersurface of the sponson, whereby a fore and aft trimming couple is obtained from the water forces for aiding in controlling the action of the aircraft during taking off from and landing on the water.

A further object is to provide a flying boat having the above characteristics, wherein the arrangement of sponson dihedral and step provide forces which bring the hull up on its main step at about 20% of the speed required to take off, thereby materially reducing the maximum resistance at slow speeds and yielding a ratio of displacement divided by resistance greater than heretofore attained.

A still further object is to provide a flying boat having the above characteristics, wherein the shape of the sponsons together with the dihedral at which they are set shall produce a favorable effect on the air drag of the flying boat hull, such that the gross air drag of the hull is less with the sponsons than without them.

Other objects reside in the novel means for adjusting the dihedral of the sponsons, the novel sponson undersurface arrangement in cooperation with the upper surface for eliminating the tendency of the outboard end of the sponsons to dip under the water, and also to effect the tendency of the sponsons to emerge from the water during the movement of the sponsons through the water; the novel attachment of the sponsons to the flying boat hull for eliminating any bending moment at the points where the sponsons connect with the hull; the corrugated hull bottoms and sponson bottoms for producing a shock absorbing or cushioning effect to the force of contacting the hull and sponsons with the surface of the water when landing.

Various other objects will be made apparent throughout the further description of the invention when taken in connection with the accompanying drawings, wherein like reference characters refer to like parts. It is to be distinctly understood that the drawings are not a definition of the invention but merely illustrate a preferred form by means of which the invention may be effectuated. The invention will be defined by the appended claims.

In the drawings:

Figure 1 is a perspective view of a flying boat embodying the invention, having a part of the covering of one strut removed in order to better illustrate a detail of the invention.

Figure 2 is a diagrammatic top plan view of one of the sponsons embodying the invention.

Figure 3 is a front elevational view of Figure 1 together with a fragment of the associated part of the flying boat hull.

Figure 4 is a sectional view taken along the line 4—4 of Figure 2.

Figure 5 is a sectional view taken along the line 5—5 of Figure 2.

Figure 6 is a sectional view taken along the line 6—6 of Figure 2.

Figure 7 is a sectional view taken along the line 7—7 of Figure 2.

Figure 8 is an end elevational view taken from the left of Figure 2.

Figure 9 is an end elevational view taken from the right of Figure 2.

Figure 10 is a fragmentary sectional view taken along the line 10—10 of Figure 2 showing the manner in which the aft portion of the sponson and corresponding thrust strut are connected to the boat hull.

Figure 11 is a fragmentary sectional view taken along the line 11—11 of Figure 2 showing the manner in which the forward portion of the sponson and corresponding thrust strut are connected to the boat hull.

Figure 12 is an enlarged perspective view of a sponson embodying the invention having the top covering removed.

Figure 13 is an enlarged vertical sectional view taken laterally through the center of a sponson illustrating another embodiment of the invention.

Figure 14 is a fragmentary detail view embodying the invention, and

Figure 15 is a diagrammatic view of a detail embodying the invention.

In the form shown, Figures 1–12, inclusive, illustrate one form of the invention, wherein 10 indicates the hull of a flying boat having conventional steps 11 and 12 provided in the aft portions of the hull bottom. A supporting surface or wing 13 is disposed above the hull 10 and its center is connected to the hull by a cabane structure 14. The body or boat hull 10 is adapted to accommodate passengers, cargo, pilots, or other useful loads.

The type of plane here shown is adapted to support the engines or power plants 15 by or from the wing 13 as shown.

In addition to the wing being connected to the upper portions of the boat hull by the cabane structure 14, there is provided a novel arrangement of the struts. The struts on each side of the plane are similarly arranged and for the sake of simplicity the struts and their associated mechanism will be described in connection with one side of the boat only.

The struts consist of a forward and aft thrust strut 16 and 17, respectively, and a forward and aft jury strut 18 and 19, respectively. The cooperating struts 16 and 18, and 17 and 19, intersect at points 21 and 22, respectively. These struts are connected to each other at these points 21 and 22 in such a manner as to form a flexible connection. In the preferred form the jury struts 18 and 19 may be each composed of two independent struts, that is the strut portion above the intersections 21 or 22 is separate from the strut portion below the intersections and the cooperating ends of these struts are connected to the associated thrust structs by pin connections. The thrust struts 16 and 17 extend outwardly and upwardly from the boat hull 10 and the upper ends connect to the forward and aft wing beams, respectively. These connections are also pin connections. The wing beams extend laterally of the wing and form the main supporting structures thereof. The lower end of the thrust struts 16 and 17 are pivotally connected to the main supporting structure of the hull frame as shown at 23 and 24, respectively.

For the purpose of assisting in the stabilizing and maneuvering of the flying boat on water, there are here provided improved sponsons represented in their entirety by 25. Each of these sponsons 25 extends laterally from the opposite sides of the boat and is so shaped and fixed to the boat hull as to operate efficiently during the maneuvering of the boat on water and also to provide aerodynamic lift when the boat is in the air.

While these sponsons do in fact possess airfoil characteristics, it is to be understood that they are primarily formed to provide a shape that is here termed "aquafoil" or "hydrofoil". In other words, the present sponsons are formed to provide a novel contour for filling the individual office of hydroplaning the boat over the water in such a manner that the boat can be properly maneuvered, while at the same time these sponsons possess sufficient aerodynamic qualities to render them desirable during flight through the air. In the present form the upper surface of the sponson is constructed according to N. A. C. A. 2300 series airfoil, while the lower surface is modified to provide a novel hydrofoil surface of improved hydrodynamic characteristics and includes the addition of a small tapered step.

Figures 10 and 11 indicate the novel means by which the root or inner end of the sponson is fixed to the side of the boat hull. Each of the sponsons is pivotally connected to the boat hull as shown at 26 and 27. A novel bracket is provided for connecting both the lower end of the forward thrust strut 16 and the forward portion of the sponson to the boat hull. This bracket is indicated at 28. A similar bracket 29 is provided for connecting the rear portion of the sponson and the lower end of the rear thrust strut 17. The brackets 28 and 29 are fixed to the main supporting structure of the hull or sponson root adjusting means later described.

The inner end or root of the sponson 25 is connected at its forward end to the boat hull adjacent the lower surface of the sponson and at its aft end at a point adjacent the upper surface of the sponson 25 in order that the pin or bolt connections will be positioned in axial relation. A well 31 is provided in the forward upper surface of the sponson adjacent the root for receiving the lower end of the thrust strut 16. The jury struts 18 and 19 have their upper ends turnably connected in one plane to the forward and rear beam, respectively, of the wing 13 and their lower ends turnably connected to the framework of the sponson 25 as shown at 30 and 40.

It can now be understood that the thrust struts 16 and 17 connect the main supporting framework of the hull with the main supporting framework of the wing 13, while the jury struts 18 and 19 connect the main supporting framework of the sponson 25 with the main supporting framework of the wing 13. The struts 16 and 18, and 17 and 19 being connected for relative movement one with the other at their intersections 21 and 22, respectively, provide novel supporting means for the hull and the sponson, and inasmuch as the sponson is pivotally connected to the hull at the points 27 and 28, the transferring of any bending moment from the sponson 25 to the hull is prevented.

The sponsons 25 are positioned to present a dihedral angle with respect to the hull 10 and novel means is provided for adjusting the dihedral of the sponson relative to the hull 10. Any suitable means may be employed for accomplishing this purpose and as here illustrated, the lower ends of the struts 18 and 19 are constructed so that the length of each of these struts may be adjusted for raising and lowering the outer end of the sponson 25 and providing the required dihedral to meet the particular conditions.

Figures 3 and 15 illustrate two distinct features of the lower section of the strut 18 and 19. This lower section of each of the struts 18 and 19 provide a shock absorber portion, or upper portion 51, and an adjustable portion, or lower portion 52. The upper portion 51 may be of any suitable type of shock absorber, while the lower portion 52 may be of any suitable mechanism for adjusting the length of each of the struts 18 and 19, and as here shown there is provided a piston 53 disposed in a cylinder 54. The upper and lower ends of the cylinder 54 are connected with oil pipes 55 and 56, respectively. These pipes 55 and 56 cooperate with a multi-valve 57, whereby they are selectively connected with an oil reservoir 58 or pump 59. The pump 59 and valve 57 are preferably positioned within operable reach of the pilot and may be either mechanically or automatically operated.

It can now be readily understood that the over-all length of the struts 18 and 19 may be shortened or lengthened by correspondingly adjusting the valve 57 and operating the pump 59 to raise or lower the piston 53 within the cylinder 54.

Each of the sponsons 25 is provided with a rearwardly inclined tapered step 32, the function of which is to provide transfer of the stabilizing forces of the sponson to the hull bottom and air surfaces with increasing speed. The hull bottom is possessed of ample directional stability at high plane speeds. However, all hulls at slow speeds are unstable in yaw and pitch, but the construction of the present sponsons and hull together provide full stability. The sponson step location and design provide for a uniform transfer of the stabilizing forces from the sponson and hull, to hull alone, with increasing speed.

It may be well to state here that one of the important features of the present invention is the operation of the dihedral of the sponson and the tapered rearward projecting sponson step in cooperation with the hull bottom surface. These features cooperate to provide a dynamic stabilizing couple to prevent undesirable pitching and yawing movements. The dihedral angle of the sponson and the rearward inclination of the sponson step operate to diminish the moment of inertia of the water plane area in proportion to the speed of the boat. Likewise the effectiveness of stabilizing forces from air surfaces of the airplane increase with speed. The present sponson arrangement permits a constant and proportional exchange of stabilizing control from water to air surfaces as speed increases.

Figure 12 illustrates the detail construction of one form of a sponson wherein 33 indicates a root beam and 34 indicates a tip beam. The main section of this form of the sponson is adapted for use as a fuel container. The container portion being defined by the root beam 33, tip beam 34, the rearmost spar 35, and the forwardmost spar 36. This fuel containing portion is divided up into a number of compartments defined by intermediate spars 37, the latter being spaced apart and held in rigid fixed relation by transverse spacer members 38.

Novel means is provided for connecting the several compartments which consists of providing a corrugated sponson bottom 39, the bottom being spot-welded or riveted to the associated beams and spars, while the corrugations serve to connect the adjacent compartments, whereby fluid is permitted to maintain the proper level throughout the fluid containing section of the sponson. It will be noted that the corrugations extend longitudinally of the aircraft, or transversely to the spars 37 which form the dividing members or partitions of the fuel tank.

In addition to the fuel containing portion of the sponson, the latter includes a trailing section 41, a nose section 42, and a tip section 43.

In this embodiment, the tip section 43 is disposed at a slight angle to the fuel carrying section and the lower surface of the forward end as well as the adjacent lower surfaces are formed upwardly as shown at 44 in order that the sponson may be maneuvered more gracefully and with less resistance through rough water. This use of the upwardly curved bottom at the front end of the wing tip 43 also prevents or retards the tendency of the sponsons to dip into the water. The lower surfaces of the greater portion of the sponson is inclined to present a forward angle of attack to either water or air, while the upper surfaces are of airfoil shape and operate as a lifting surface during passage of the boat through the air.

Another advantage of the present construction is that the lower surface of the sponson is planing upon the waves from under the hull throughout the entire planing period including the last instant before the hull leaves the water, and hence the stabilizing effects of the sponson are present during all stages of planing. The stabilizing influence of this auxiliary planing surface is independent of the conditions of the water surface because the sponsons operate upon the flow of water coming from under the hull. This flow is made uniform by the forebody and curved chine 61, see Figure 3, of the hull. Consequently, the present sponson arrangement provides moments which hold the hull in its most efficient planing attitude during successive stages of taking off, thus eliminating misjudgment of piloting and providing automatic take-off features.

Figure 13 illustrates a different embodiment of the invention, wherein the tip section 43' is a continuation of the fuel carrying section and is not disposed at a definite angle to the fuel carrying section as illustrated in the embodiment first above described. However, the outer end of the sponson tip 43' as well as the adjacent front end side and bottom edges are rounded off to permit easy passage of water and air therearound.

The entire sponson is leakproof and the entire framework of the sponson may be covered with plain sheets of metal with exception of the bottom of the fuel carrying section which employs a corrugated sheet of metal for the purpose described. Also other portions of the bottom as well as the top may employ a corrugated covering in order to strengthen the covering, as for instance, the step portion on the top of the sponson adjacent the hull.

A novel means is provided for forming a leakproof connection at the ends or edges of the corrugated bottom which consists of the employment of an angular member having one plane flange 151 and one corrugated flange 152 (see Figure 14), the latter extending substantially at right angles to the plain flange, the corrugated flange 152 being adapted to register with the cooperating end portion of the tank bottom 39.

Suitable packing or insulating material 153 is employed between the overlapping corrugated members 39 and 152, whereby they may be drawn into rigid leakproof connection.

The present sponsons do not only assist in the maneuvering of the boat on water, but provide novel means for carrying loads such as fuel in large quantities. The weight of this fuel as well as the sponsons themselves are so close to the center of gravity as not to interfere with the lateral controls. In other words, one sponson tank may be loaded with gasoline, while the other is empty and even this difference in weight of the two sponsons would only require a slight adjustment in the aileron tabs 45 carried by the aileron 46 of the wing 13.

Figure 3 illustrates the bottom of the boat hull 10 as being corrugated. It has been discovered by experiment that by providing the boat hull with the corrugated bottom, the impact of the hull with the water when landing is greatly reduced due to the trapping of air in the corrugated grooves by the water. This entrapped air acts as a shock absorber and produces a cushioned effect to the impact of the hull with the water.

Another feature of the invention is the provision of means for adjusting the sponson root relative to the chine 61 of the boat hull 10. This is important in that the location of the sponson root in combination with the V bottom of the hull is an adjustment of loading per square foot of the hull area. Figures 11 and 10 diagrammatically show means for adjusting the members 28 and 29, respectively, relative to the chine 61 of the boat hull. Each of these members 28 and 29 is provided with an inwardly extending projection 70 having a threaded opening therethrough for receiving a threaded shaft 71. Each of these threaded shafts 71 is turnably supported at its bottom and top by bearing members 72 and 73, respectively, these bearing members 72 and 73 being carried by the framework of the hull 10. The top of each of these shafts 71 is provided with a gear 74 in mesh relation with an actuating gear 75. The gears 75 may be either manually or automatically operated to rotate their respective shafts 71 for moving the members 28 and 29 upwardly or downwardly relative to the associated chine 61. It is to be distinctly understood that other means may be provided for moving the sponson root relative to the chine, such as hydraulically operated means.

One of the primary features of the present flying boat construction resides in the improved maneuverability of the flying boat on water particularly when maneuvering the flying boat against high cross-winds. The dihedral at which the sponson is disposed relative to the hull together with the inclination of the adjacent hull bottom operates to effect an inherent tendency of the flying boat to heel or lean into the wind. This is probably due to the force of the wind or waves tending to shove or push the flying boat sideways, at which time the sponson being disposed at a dihedral together with the adjacent inclined hull bottom of the boat causes the boat to heel into or lean toward the direction of the wind or waves tending to push the boat sideways. By adjusting the dihedral of the sponson, the present flying boat may be readily adapted to meet the varying conditions under which such an aircraft is subjected during hydroplaning.

Another important feature of the invention is the advantages gained by the sweep-back or rearwardly inclination of the main step in the planing surface with the dihedral or V bottom of the planing surface which tends to move the mean step area forward as the speed increases. The planing surface, as here referred to, includes the bottoms of both the hull and the sponsons and the main step consists of the forward step in the hull together with the cooperating rearwardly inclined step in the sponson. It can now be understood that as the speed of the flying boat increases the width of the effective planing area decreases until finally the effective planing area is reduced to the width of the boat hull itself. Therefore, the rearward inclination of the step operates to move the step pressure area forward with increasing speed.

While the present invention has been described in connection with large flying boats of the transoceanic type, it will be obvious to those skilled in the art that the novel features of the invention may be utilized in the construction of flying boats of any type and that other changes, substitutions, modifications, additions, and omissions may be made in the structure herein illustrated without departing from the spirit and scope of the appended claims.

I claim:

1. A sponson comprising a leakproof buoyant body having a leading edge and a tip edge, and having its tip edge located generally lower than the outer portion of its leading edge, the tip edge having a portion adjacent such leading edge sloping downwardly and rearwardly.

2. A sponson comprising a leakproof body, the said body including a tank portion and a free tip portion, the front part of the said tip portion extending upwardly at an angle to the said tank portion.

3. A sponson in accordance with claim 2, wherein the said portion is divided into a plurality of compartments and means for interconnecting the said compartments, the said means including a corrugated bottom.

4. A flying boat including a hull, a wing disposed above the said hull and fixedly connected thereto, a strut pivotally connected to the said hull and pivotally connected to the said wing and a sponson extending laterally from the said hull, the said sponson being pivotally connected to the said hull and another strut pivotally connected to the said sponson and the said wing.

5. A flying boat in accordance with claim 4, wherein the said struts intersect one another and means for pivotally connecting the said struts at the said intersections.

6. A flying boat including a hull having a chine, a sponson extending laterally from said hull and having a root intersecting the said hull and means for vertically adjusting the said root relative to the said chine.

7. A sponson comprising a leakproof body, the said body including a base portion and a free tip portion, the front part only of the lower surface of said tip portion being inclined upwardly and outwardly and defining an angle with the plane of the lower surface of the adjacent portion of the sponson.

8. A sponson comprising a leakproof body forming a fuel chamber, a dividing wall in said sponson dividing said fuel chamber into a plurality of compartments, the bottom of said sponson being corrugated, the corrugations extending at an angle to the dividing wall so as to form communicating passages between the compartments.

9. A sponson comprising a leakproof body forming a fuel chamber, spars in said sponson dividing the fuel chamber into a plurality of compartments, the bottom of said sponson being corrugated, the corrugations running fore and aft so as to form communicating passages between the compartments.

10. A flying boat including a body, a sponson, and vertically adjustable means for securing the sponson to the body.

11. A flying boat having a hull, a sponson, and means at the root of said sponson to connect the same to the hull, said means being adjustable to vary the vertical position of the sponson root with respect to the hull.

12. In a sponson, a step in the bottom surface thereof, the area of the sponson bottom behind said step tapering rearwardly and outwardly.

13. A flying boat including a hull, a wing above and connected to said hull, inclined struts having their upper ends pivotally connected to said wing at points spaced longitudinally of the boat and their lower ends pivotally connected to the hull at points spaced longitudinally of the boat, the axes of the pivotal connections to the hull being aligned, and a sponson pivotally connected to the hull at spaced points, the axes of such pivotal connections being aligned, the pivotal connections of the struts to the hull and the pivotal connections of the sponson being arranged in pairs, each pair of such pivotal connections being located on a single member, and means securing said member to the hull, said sponson having the front at a different level from the back and having a recess therein into which one of said struts extends.

14. A flying boat including a hull, a wing above and connected to said hull, inclined struts having their upper ends pivotally connected to said wing at points spaced longitudinally of the boat and their lower ends pivotally connected to the hull at points spaced longitudinally of the boat, the axes of the pivotal connections to the hull being aligned, and a sponson pivotally connected to the hull at spaced points, the axes of such pivotal connections being aligned, the pivotal connections of the struts to the hull and the pivotal connections of the sponson being arranged in pairs, each pair of such pivotal connections being located on a single member, and means securing said member to the hull and for vertically adjusting the position of said member with respect to the hull, said sponson having the front at a different level from the back and having a recess therein into which one of said struts extends.

15. A flying boat including a hull having a straight transverse step therein, sponsons extending laterally from opposite sides of said hull with their bottoms extending upwardly and outwardly and positioned adjacent and above said step, and cooperating steps in the sponson having their inner ends in substantially the same transverse plane as the outer ends of the step in the hull, said sponson steps being arranged at an outward and rearward inclination to the transverse plane of the hull, whereby the load is gradually transferred from the sponsons to the hull.

GLENN L. MARTIN.

CERTIFICATE OF CORRECTION.

Patent No. 2,147,795.  February 21, 1939.

GLENN L. MARTIN.

It is hereby certified that error appears in the above numbered patent requiring correction as follows: In the drawing, sheet 2 thereof, strike out figures 10 and 11 and insert instead the following —

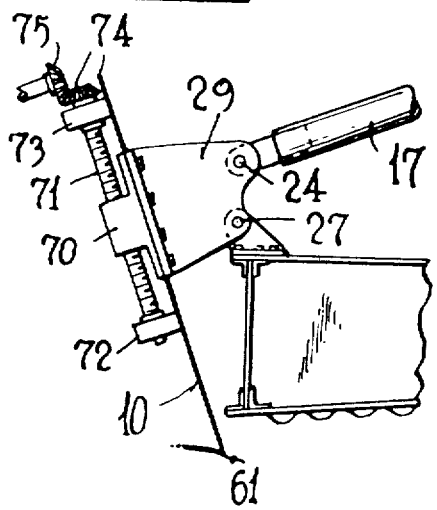
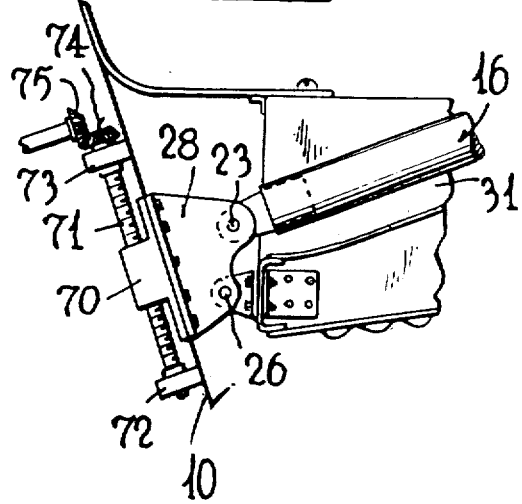

and that the said Letters Patent should be read with this correction therein that the same may conform to the record of the case in the Patent Office.

Signed and sealed this 15th day of August, A. D. 1939.

Leslie Frazer (Seal)

Acting Commissioner of Patents.